United States Patent
Yi et al.

(10) Patent No.: US 7,971,064 B2
(45) Date of Patent: Jun. 28, 2011

(54) DISTRIBUTED RIVEST SHAMIR ADLEMAN SIGNATURE METHOD AND SIGNATURE GENERATION NODE

(75) Inventors: Jeong Hyun Yi, Daejeon (KR); Tae-Chul Jung, Seongnam-si (KR); Eun Ah Kim, Seoul (KR); Alexandra Afanasyeva, Seoul (KR); Alexey Fomin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1079 days.

(21) Appl. No.: 11/798,403

(22) Filed: May 14, 2007

(65) Prior Publication Data

US 2008/0155265 A1 Jun. 26, 2008

(30) Foreign Application Priority Data

Dec. 21, 2006 (KR) ........................ 10-2006-0132242

(51) Int. Cl.
*H04L 9/00* (2006.01)
(52) U.S. Cl. .............................. 713/180; 380/28; 380/30
(58) Field of Classification Search ........................ None
See application file for complete search history.

(56) References Cited

U.S. PATENT DOCUMENTS

| | | | |
|---|---|---|---|
| 2001/0016911 A1* | 8/2001 | Obana | 713/180 |
| 2002/0164033 A1 | 11/2002 | Rajasekaran | |
| 2003/0147535 A1 | 8/2003 | Nadooshan et al. | |
| 2003/0210785 A1* | 11/2003 | Jian | 380/210 |
| 2006/0140401 A1* | 6/2006 | Johnson et al. | 380/44 |

FOREIGN PATENT DOCUMENTS

| | | |
|---|---|---|
| KR | 10-2005-0006418 A | 1/2005 |
| KR | 10-2005-0034184 A | 4/2005 |
| KR | 10-2006-0067787 A | 6/2006 |

* cited by examiner

*Primary Examiner* — Minh Dinh
*Assistant Examiner* — David Le
(74) *Attorney, Agent, or Firm* — NSIP Law

(57) ABSTRACT

A distributed Rivest Shamir Adleman (RSA) signature generation method in an ad-hoc network and a signature generation node are provided, including steps for distributing key information to a plurality of nodes using an RSA parameter and a maximum distance separable (MDS) code, in a dealer node, generating a partial signature using the key information and transmitting the generated partial signature to a signature generation node, in the plurality of nodes, and generating an RSA signature using the partial signature, in the signature generation node, wherein the RSA signature is generated using the partial signature, received from a fewer number of nodes than the entire plurality of nodes.

22 Claims, 5 Drawing Sheets

DISTRIBUTED RIVEST SHAMIR ADLEMAN SIGNATURE METHOD AND SIGNATURE GENERATION NODE

CROSS-REFERENCE TO RELATED APPLICATION

This application claims the benefit under 35 U.S.C. §119 (a) of Korean Patent Application No. 10-2006-0132242, filed Dec. 21, 2006, in the Korean Intellectual Property Office, the entire disclosure of which is incorporated herein by reference.

BACKGROUND OF THE INVENTION

1. Field of the Invention

The following description relates to a distributed Rivest Shamir Adleman (RSA) signature generation method in an ad-hoc network and a signature generation node. More particularly, the following description relates to a distributed RSA signature generation method which can use an RSA signature without interaction among nodes in a distributed RSA signature which distributes a function of a dealer node of a necessary certification authority for management of keys on the ad-hoc network, and a signature generation node.

2. Description of Related Art

Ubiquitous networking indicates that various networks are united based on an Internet Protocol (IP) to provide a seamless networking service to a user. When a ubiquitous service is desired to be realized by using wideband wireless network techniques in the present infrastructure base, there may be problems in that, as users increase, a cell range decreases, and expansion of the network infrastructure is naturally required to overcome the decreases of the cell range. Subsequently, costs may be increased to maintain the network infrastructure and to build further network infrastructure. Also, there may be other problems in that, an entire network may be paralyzed when the network infrastructure is broken due to disasters such as war, fire, flooding, and so forth.

Mobile ad-hoc networks are required to reduce the costs for building the network infrastructure and to realize infrastructure-less wireless networking. Features of the mobile ad-hoc networks are as follows:

1. Self-organization: All nodes perform functions of a terminal and a router, and voluntarily configure a network;
2. Dynamic Topology: Topology of a network dynamically changes due to frequent movements of wireless terminal nodes;
3. Lack of Central Authority: There is neither a node functioning as a backbone, nor a node functioning as a certain node exist;
4. Lack of Association: It is not easy to control a network due to the lack of central authority feature, resulting in difficulties in controlling a node join and protection against malicious nodes;
5. No Synchronous Communication: Synchronous communication is impossible due to features of the dynamic topology. That is, synchronous communication is impossible when all nodes are simultaneously connected to a network; and
6. Bandwidth and Power Constraints: There is a limitation of network resources since the network is configured with wireless mobile devices.

Basically, security requirements on the ad-hoc network are similar to security requirements on other networks. Conversely, in the case of an ad-hoc wireless network in a distributed computing environment such as a fully wireless ad-hoc network, it is inevitable to use encryption keys in unreliable circumstances. Therefore, a probability of relying on the encryption keys is increased. Accordingly, it is important to build a reliable relation between the encryption keys, and to distribute the encryption keys to the entire ad-hoc network. A distributed signature scheme based on a public key is one of the solutions that can solve the above problem.

In the distributed signature scheme, a message is encrypted using a secret key from a reliable certification authority, and the encrypted message is decrypted using a public key of the reliable certification authority, and a validity is verified.

However, all nodes on the network are required to perform a function of the reliable certification authority since the reliable certification authority does not exist in the ad-hoc network. The distributed signature scheme is based on secret sharing. Namely, the secret sharing indicates that secret information such as a secret key is shared based on a mathematical algorithm, and the secret information is restored using the shares. A Shamir method is one of the representative methods based on a polynomial interpolation for the secret sharing.

Figure 1:
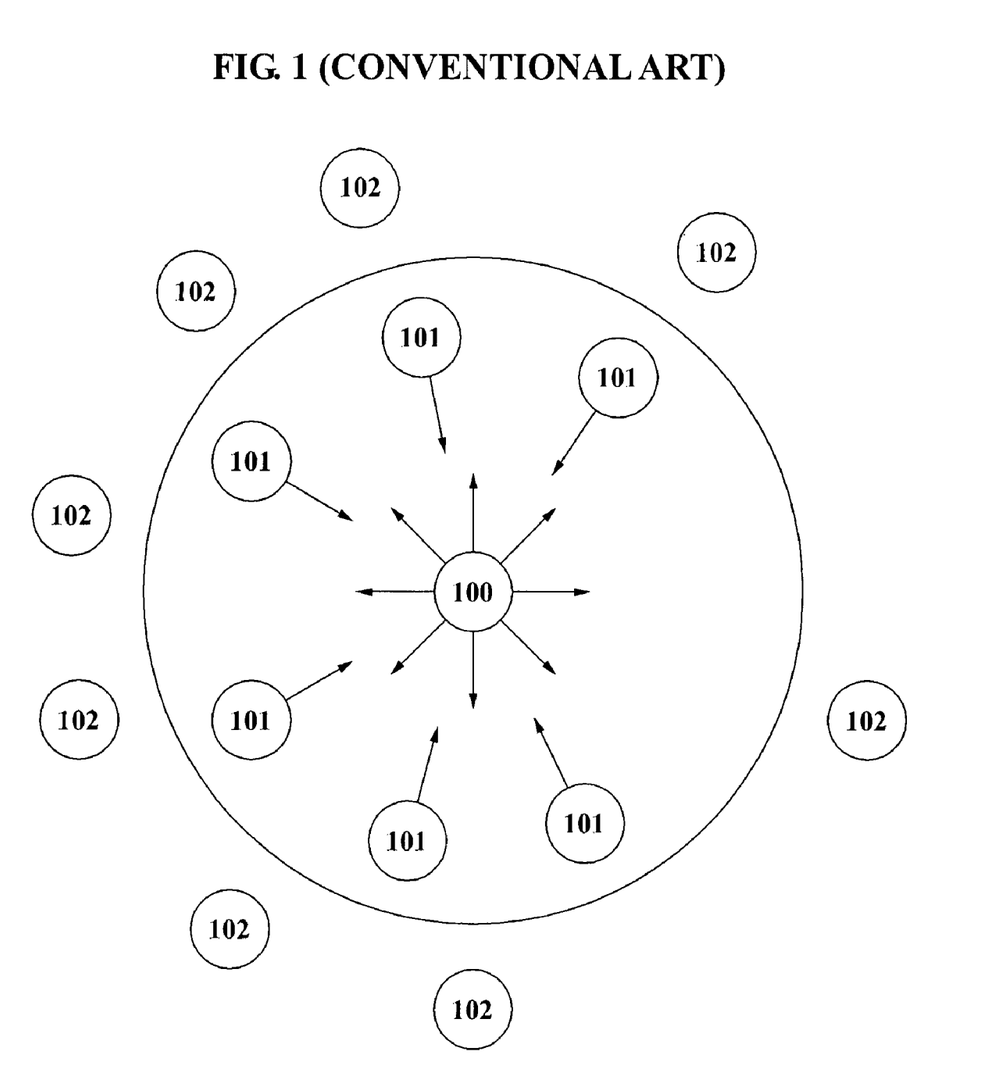
FIG. 1 is a diagram illustrating an example of a distributed RSA signature method in the conventional art.

The polynomial interpolation is a type of algorithm. A unique 't-1'-degree polynomial can be defined when 't' number of different points exist in a two-dimensional space, that is, after the 't-1'-degree polynomial is defined and points in the 't-1'-degree polynomial are distributed. When at least 't' number of points are collected, an original polynomial can be found. The polynomial interpolation is suitable for the secret sharing. FIG. 1 is a diagram illustrating an example of a distributed RSA signature method in the conventional art.

Specifically, among the nodes of an ad-hoc network, a signature generation node 100 requests neighbor nodes 101 and 102 for secret shares of the neighbor nodes 101 and 102. The neighbor nodes 101 and 102 then transmit their own secret shares to the signature generation node 100. Subsequently, the signature generation node 100 may generate the RSA signature using the secret shares of the neighbor nodes 101 and 102.

However, in the conventional art, the Shamir's distributed RSA signature generation method has a problem in that, at least 't' number of points, that is, at least 't' number of nodes, are required to simultaneously exist when using the polynomial interpolation which means communication among shareholders having the 't' number of points may occur, that is, interaction among the shareholders occur. Subsequently, a leak of information about the shareholders may occur.

Figure 2:
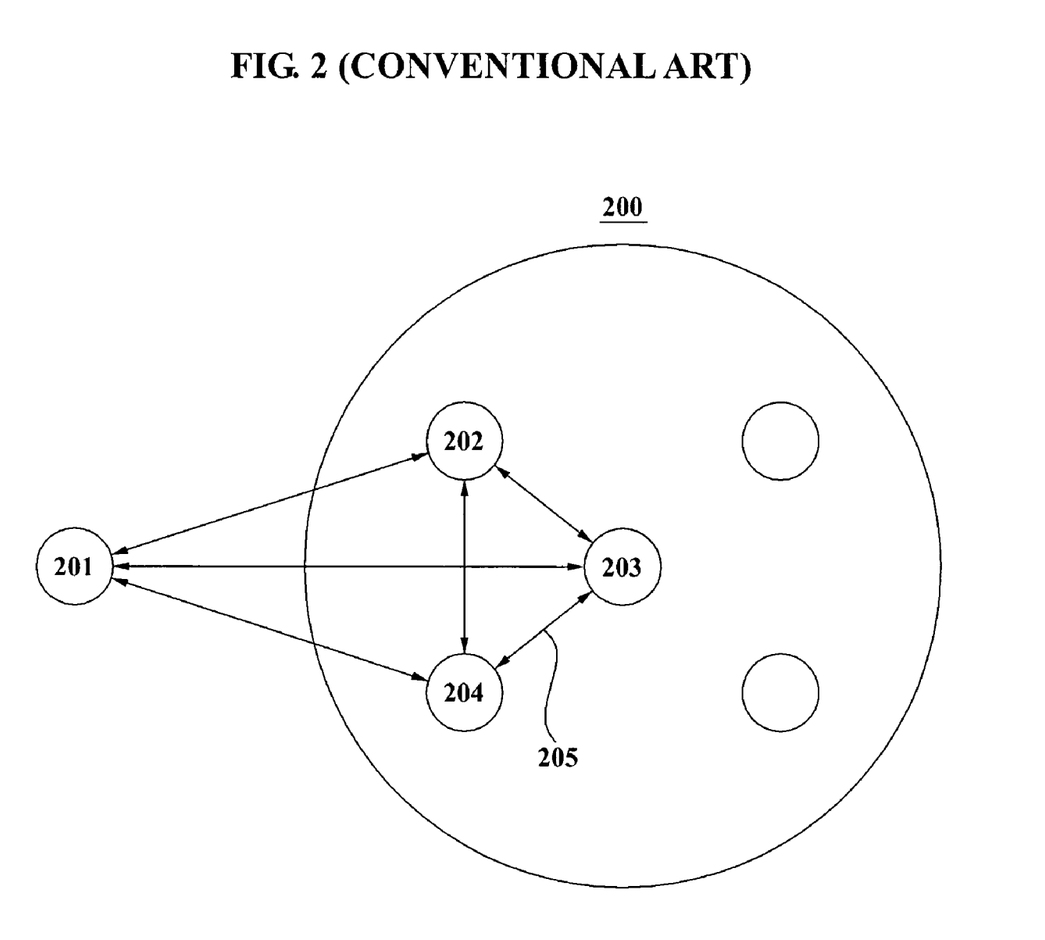
FIG. 2 is a diagram illustrating an example for describing the interaction in the distributed RSA signature method in the conventional art.

FIG. 2 is a diagram illustrating an example for describing the interaction in the Shamir's distributed RSA signature method in the conventional art.

In order to communicate with a plurality of nodes of an ad-hoc network 200, that is, for an RSA signature, a new node 201 communicates with nodes 202 through 204 of the plurality of nodes. This is considered as essential communication, however, this is not considered as the interaction. The nodes 202 through 204, having received the request for the signature from the node 201, collect a partial signature generated by using the nodes' 202 through 204 own shares to generate a public key. Generally, identification (ID) information of the nodes 202 through 204 is required when generating the partial signature.

However, the conventional distributed RSA signature method has problems in that, additional communication, such as collecting information of other nodes to generate the partial signature, may occur, that is, an interaction 205 may occur. This may cause a security problem. There is another problem in that, all nodes are required to simultaneously exist in an environment where topology frequently changes, similar to the ad-hoc network 200.

Accordingly, to address the above and other problems, a non-interactive distributed RSA signature method is required.

BRIEF SUMMARY OF THE INVENTION

In one general aspect, there is provided a distributed Rivest Shamir Adleman (RSA) signature generation method in an ad-hoc network, and a signature generation node which can share a function of a signature generation without interaction by including an RSA secret key in a maximum distance separable (MDS) code when a node on the ad-hoc network generates shares using the MDS code. This generation is possible by using a unique feature of the MDS code capable of generating the RSA secret key and an entire MDS code using a predetermined plurality of the shares.

In another general aspect, there is provided a distributed RSA signature generation method in an ad-hoc network and a signature generation node which can generate a new share in the node to share a function of signature generation, and generate a witness to determine whether the share is valid.

In another general aspect, there is provided a distributed RSA signature generation method in an ad-hoc network, including distributing key information to a plurality of nodes using an RSA parameter and a maximum distance separable (MDS) code, in a dealer node, generating a partial signature using the key information and transmitting the generated partial signature to a signature generation node, in the plurality of nodes, and generating an RSA signature using the partial signature, on the signature generation node. The RSA signature is generated using the partial signature, received from a fewer number of nodes than the plurality of nodes.

The method may further provide that the distribution of the key information to the plurality of nodes using the RSA parameter and the MDS code includes generating a public key and a private key via the RSA parameter, generated by using prime numbers 'p' and 'q', generating the MDS code using the private key, a generator matrix using a feature of the Wandermond matrix, and an information vector, and distributing the shares which are elements of MDS code as key information to the plurality of nodes.

The method may further provide that the key information inlcudes 'n' number of element ci included in the MDS code and an element of information vector 'i', and the plurality of nodes generating the partial signature using the key information, and the transmitting of the generated partial signature to the signature generation node comprises generating the partial signature Si in accordance with Equation (1) below:

$$S_i(m)=m^{ci} \mod N,$$ [Equation1]

where 'm' denotes a required message to sign using the RSA signature, and N denotes a modulus which is the multiplication of the prime numbers 'p' by 'q' to generate the RSA parameter; generating a partial signature witness using the partial signature, and transmitting the partial signature and the partial signature witness to the signature generation node.

The method may further provide that the signature generation node generates the RSA signature after receiving the partial signature from 't' number of nodes, the required number for the RSA signature generation, and the generating of the RSA signature using the partial signature converting the generator matrix, into matrix G' which includes a diagonal form of a partial matrix, a partial matrix of the generator matrix, corresponding to column parts il, . . . , it of the generator matrix G in accordance with Equation (2) below:

$$G=[(g^i)_{i-1} \mod \rho],$$ [Equation2]

where G is t x (n +1) sized, 'n' denotes a number of the plurality of nodes, 't' denotes a required number of nodes for the RSA signature generation, 'i' and 'j' respectively denote $i^{th}$ row and $j^{th}$ column of the G, ρdenotes a prime number greater than max (g), and g denotes an element of $Z_N^*$ of a prime number. The method further comprises generating G' in accordance with Equation (3) below:

$$G' = \begin{pmatrix} & i_1 & & i_t & & & \\ g'_{11} & \cdots & \lambda & \cdots & 0 & \cdots & 0 & \cdots \\ \vdots & & 0 & \cdots & \lambda & \cdots & \vdots & \cdots \\ & & \vdots & & & \cdots & 0 & \cdots \\ g'_{t1} & & 0 & & 0 & \cdots & \lambda & \cdots \end{pmatrix},$$ [Equation 3]

where λdenotes a least common multiple (L.C.M.), so that elements of G' become integer number and G' generating the RSA signature using remaining columns, except a column converted into the diagonal formed matrix.

In another general aspect, there is provided a signature generation node in an ad-hoc network including a partial signature receiver for receiving a partial signature from a predetermined number of nodes in the ad-hoc network, and an RSA signature generator for generating an RSA signature using a generator matrix, generated using the partial signature and a feature of the Wandermond matrix. The generator matrix is converted using a partial matrix of the generator matrix and an inverse matrix of the partial matrix.

Other features and aspects may be apparent from the following detailed description, the drawings, and the claims

BRIEF DESCRIPTION OF THE DRAWINGS

Throughout the drawings, like reference numerals will be understood to refer to like parts, components and structures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Maximum Distance Separable (MDS) Code

It can be assumed for example that arrays of 'n' number of elements which exist in a finite field GF(q), made of 'q' number of elements, is n-tuple vectors, and a set of the n-tuple vectors is a vector space $GF(q)^n$. A predetermined vector 'α' included in the $GF(q)^n$ is represented as, $\alpha=(\alpha_1, \ldots, \alpha_n)$. In this case, Hamming weight HW(α) and a Hamming distance dist($\alpha$, $\beta$) can be defined with respect to vectors included in a predetermined partial vector space of the vector space.

The Hamming weight denotes a number of elements of the n-tuple vectors except zero, and the Hamming distance denotes a number of elements of two different n-tuple vectors that exist in the partial vector space.

Namely, when the Hamming weight and the Hamming distance are used, the Hamming distance between the predetermined two different n-tuples can be represented as shown in Equation (4) below.

$$HW(\alpha-\beta) \quad \text{[Equation 4]}$$

A minimum value of the Hamming weight with respect to the vectors in the predetermined partial vector space of the vector space can be represented as shown in Equation (5) below.

$$\min\{dist(\alpha, \beta) | \alpha, \beta \in C, \alpha \neq \beta\} = d \quad \text{[Equation 5]}$$

In this case, a linear code in the vector space can be defined by using the minimum Hamming distance. As an example, a set of R number of vectors, existing in the partial vector space and having the minimum distance 'd', is $(n, R, d)_q$ codes. An n-tuple vector of the codes of the set is a codeword.

When a code C is the partial vector space of the vector space, generated by using 't' number of elements, and when a minimum Hamming distance is 'd', the code C is linear code. Namely, the code C can be represented as a set $[n, t, d]_q$ of vectors, generated by linear combination of 't' number of linear independent vectors.

The code C may have the following features:
1) A codeword generated by the linear combination of two code words, included in the code C;
2) A codeword in which all elements are zero always exists in the code C; and
3) A minimum distance of the linear code C is the same as a minimum Hamming weight.

Based on the third feature, the linear code C whose minimum distance is 'd' is the partial vector space of the vector space whose minimum weight is 'd'. In this case, a dual code can be defined with respect to the code C. Specifically, when computation $<\alpha, \beta>$ with respect to the codeword a of the linear code $C([n, t, d]_q)$ and when a predetermined vector $\beta$ is an inner product, a set, $$C^\perp = \{\beta | <\alpha, \beta> = 0, \forall \alpha \in C\},$$

can correspond to the dual code.

The dual code $C^\perp$ of the linear code C is an n-t-dimensional linear code. Namely, a number of elements which generate the codeword of the dual code is n-t.

A matrix whose rows are made of the elements which generate the linear code C is a generator matrix G. Namely, all code words of the linear code can be generated via linear combination with respect to the rows of the generator matrix G. Also, the generator matrix G is t×n sized.

When a parity check matrix H is a generator matrix with respect to the dual code of the linear code, the parity check matrix H conforms to, $$\alpha^T H = 0,$$

and is (n−t)×n sized.

The linear code conforms to, $$d \leq n-t+1,$$

and this linear code is called the Singleton bound, more particularly, it is called an MDS code. The following features 1) through 3) are equivalent with each other with respect to the MDS code.

1) The linear code is $[n, t, n-t+1]_q$ MDS code;
2) When a predetermined 't' number of rows of a generator matrix of the linear code are selected, the selected rows are linearly independent; and
3) A dual code of the linear code is $[n, n-t, t+1]_q$ MDS code.

Threshold Scheme from MDS Code

Hereinafter, a codeword is generated using a generator matrix of the MDS code to embody a (t,n)-threshold scheme, each element of the codeword is used for an RSA secret key and shares of secret sharing.

A generator matrix G of $[n+1, t, n-t+2]_q$ MDS code is a t×(n+1) matrix. In this case, through the computation aG=c between a predetermined t-tuple information vector 'a' made of an element as of an finite field (GF(q)) and the generator matrix, a unique codeword 'c' included in a linear code C is represented as shown in Equation (6) below:

$$(a_1, \ldots, a_t) G = (c_0, \ldots, c_n), \quad \text{[Equation 6]}$$

wherein a first element $c_0$ of the codeword is taken as a secret key S, and remaining 'n' number of elements $c_1, \ldots, c_n$ are taken as the shares to be distributed to 'n' number of protocol join nodes $P_1, \ldots, P_n$. The first element $c_0$ of the secret key S is represented as shown in Equation (7) below:

$$c_0 = a_1 g_{11} + a_2 g_{21} + \ldots + a_t g_{t1}, \quad \text{[Equation 7]}$$

wherein, $$c_0 = S,$$

that is, the secret key.

A Distributed RSA Signature Generation Method and Signature Generation Node

Figure 3:
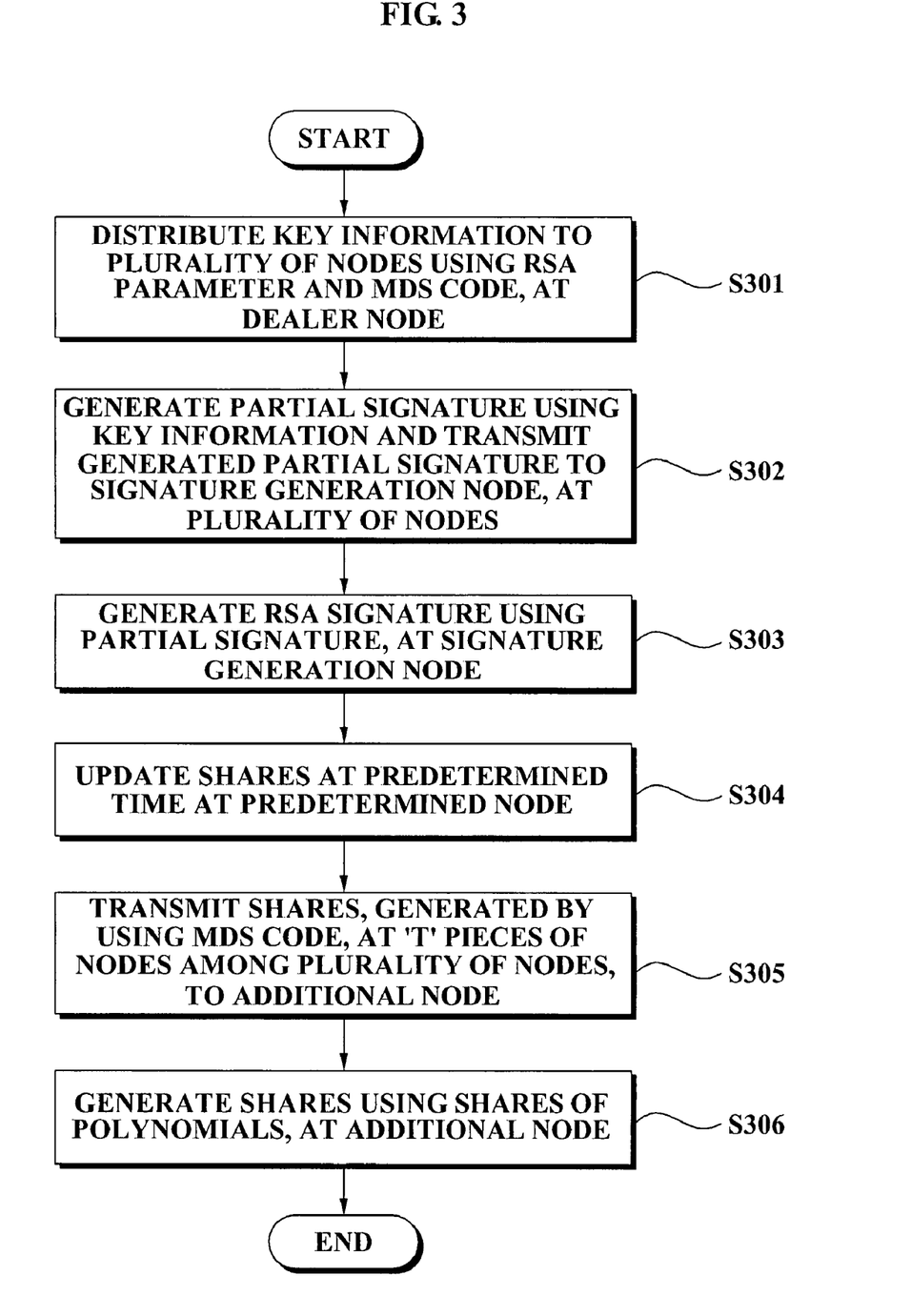
FIG. 3 is a flowchart illustrating an example of a distributed RSA signature method.

FIG. 3 is a flowchart illustrating an example of a distributed RSA signature method.

In operation S301, a dealer node distributes key information to a plurality of nodes using an RSA parameter and an MDS code. Specifically, in operation S301, the RSA parameter and the MDS code can be used to distribute a share index 'i' and a share $c_i$ to the plurality of nodes, that is, to 'n' number of nodes joining a protocol.

The RSA parameter can be generated by using large prime numbers 'p' and 'q', as the RSA parameter, public keys 'e' and N. A secret key 'd' can be generated by using the prime numbers 'p' and 'q'.

Specifically, the dealer node generates the different prime numbers 'p' and 'q', and a predetermined positive number e (1<e<Ø) is selected to satisfy 'ed≡1 mod Ø' when calculating N=pq, and Ø. Also, the dealer node calculates a positive number d (1<d<Ø) which conforms to ed≡1 mod Ø using the extended Euclidean algorithm, and generates the public keys 'e' and N, and the secret key 'd'.

The MDS code can include the above described $[n+1, t, n-t+2]_q$ MDS code to embody a (t, n)-threshold scheme. The (t, n)-threshold scheme is to generate an RSA signature using 't' number of nodes from among 'n' number of nodes in the ad-hoc network, and the secret key is required to generate the RSA signature. This generation is required for the operation of exponentiation of secret key 'd' by a message 'm', the secret key 'd' is distributed to the 'n' number of nodes, and the secret key 'd' is then found using the 't' number of nodes, among the 'n' number of nodes.

The MDS code is generated using a t×(n+1) sized generator matrix G, and a number of elements of the MDS code becomes n+1. The first element is taken as the secret key 'd' among the n+1 elements of the MDS code, the secret key 'd' is shared by remaining 'n' number of nodes, and consequently, the RSA signature is generated by using shares included in the 't' number of nodes.

In this case, the generator matrix G can be generated using a feature of the Wandermond matrix in accordance with Equation (2), repeated below.

$$G=[(g^j)^{i-1} \bmod \rho] \quad \text{[Equation 2]}$$

The Wandermond matrix is a t×n sized matrix whose 't' number of columns are always linearly independent, and the Wandermond matrix can be used as the generator matrix G.

The MDS code can be generated using the generator matrix G in accordance with Equation (8) below:

$$c=aG=(c_0, \ldots, c_n), \quad \text{[Equation 8]}$$

wherein 'a' is defined as, $$a=\{a_1, \ldots, a_t\}(a_i \in (0, \phi(N)),$$

and a value of the $c_0$ is controlled to have a value of the private key 'd'. A range of $c_i$ is, $$c_i \leq t\rho\phi(N),$$

wherein the Ø(N) is represented as Ø(N)=(p−1)(q−1) of an Euler function, and N denotes multiplication of 'p' by 'q'.

Namely, the key information can be distributed by transmitting a pair of 'i' and $c_i$ (1≤i≤n), except the secret key $c_0$, to an 'i' node.

Also, the dealer node can generate a witness to determine whether shares included the 't' number of nodes are valid, that is, whether the shares are generated by using a correct information vector and a correct generator matrix, and the witness is represented as shown in Equation (9) below:

$$w_i = g^{a_i} \bmod N, \quad \text{[Equation 9]}$$

wherein the key information can include the witness, and can be open for a plurality of nodes or a signature generation node.

In operation S302, the plurality of nodes generate partial signatures using the key information, and transmit the generated partial signatures to the signature generation node.

As described above, since the secret key can be found by using the shares included in the 't' number of nodes among the plurality of nodes, the generation of the RSA signature using the secret key and the generation of the RSA signature using the partial signatures generated using each share included in the 't' number of nodes, have the same results.

However, when the shares are directly delivered to a node which has the message 'm' and requires a signature with respect to the message 'm', the node subsequently generates the RSA signature. This generation is undesirable because of the exposure of the secret key 'd'. Therefore, nodes, which have the shares generate the partial signature and deliver the partial signature to the signature generation node which requires the RSA signature, and consequently, the signature generation node can generate a complete RSA signature using the 't' number of the partial signature.

In this case, the plurality of nodes can use Equation (1) to generate the partial signature.

Also, similar to the witness, in order to determine whether the partial signature is correct, a partial signature witness, that is, an H and 'z' pair, is transmitted to the signature generation node by calculating values of H and 'z'. For this, the plurality of nodes selects a random number 'r' in accordance with Equation (10) below:

$$r \in (0, \ldots, 2^{\log_2 N+2L_H}-1), \quad \text{[Equation 10]}$$

wherein $L_H$ denotes a hash length, and calculate the H and the 'z' using the random number 'r' in accordance with Equations (11) and (12) below:

$$H(g, m, w_i', S_i(m), g', m'), \quad \text{[Equation 11]}$$

wherein, $$g'=g^r \bmod N,\ m'=m^r \bmod N,\ w'=g^{c_i} \bmod N,$$

and, $$z=c_i c+r. \quad \text{[Equation 12]}$$

Namely, in operation S302, the plurality of nodes transmits $S_i$, 'z', and H to the signature node.

In operation S303, the signature generation node generates the RSA signature using the partial signature. In this case, the RSA signature can be generated using the partial signature, received from a fewer number of nodes than the plurality of nodes.

Initially, the signature generation node uses the partial signature witness to determine whether the partial signature, received from the 't' number of nodes, is valid. Specifically, the signature generation node calculates the partial signature witness in accordance with Equation (13) below:

$$w' = \prod_{j=1}^{t}(w_j)^{g_{ji}} \bmod N, \quad \text{[Equation 13]}$$

and compares, $$H(g, m, w_i', S_i(m), g^z(w_i')^{-c}, m^z S_i(m)^{-c}),$$

with a value of 'c', and determines that the partial signature is valid when the compared values are substantially the same.

This can be verified by using Equations (14) and (15) below.

$$g^z(w_i')^{-c}=g^z g^{-c_i c}=g^{z-c_i c}=g^r=g' \bmod N \quad \text{[Equation 14]}$$

$$m^z S_i(m)^{-c}=m^z m^{-c_i c}=m^{z-c_i c}=m^r=m' \bmod N \quad \text{[Equation 15]}$$

Also, the signature generation node generates the RSA signature using the partial signature, determined as valid. The generation of the RSA signature using the partial signature, determined as valid, is performed after receiving 't' number of partial signatures, required for the generation.

As described above, among the n+1 number of elements of the MDS, the first element is taken as the secret key, remaining 'n' number of elements are taken as the shares, and the plurality of nodes generate the partial signature. Specifically, the RSA signature is generated using 't' number of partial signatures from 'n' number of partial signatures, and for the RSA signature generation, columns of the generator matrix, associated with the 't' number of the partial signature, are represented as $i_1, \ldots, i_t$.

The signature generation node converts the partial matrix, which includes $i_1, \ldots, i_t$ columns of the generator matrix G, into a diagonal formed matrix G' of Equation (3) described above.

For this, the signature generation node calculates an inverse matrix ($G_{sub}^{-1}$) of a partial matrix ($G_{sub}$), that is, columns of the $i_1, \ldots, i_t$ of the generator matrix G, and generates G' in accordance with Equation (16) below:

$$G'=[G_{sub}^{-1}\dot{P}\dot{G}_{sub}G_{sub}^{-1}]=[G_{sub}^{-1}\dot{P}\dot{J}], \quad \text{[Equation 16]}$$

wherein the conversion of the generator matrix G into G' performs a calculation to configure a signature in accordance with Equation (17) below:

$$O(t \log \rho^{2t})=O(t^2)\log \rho, \quad \text{[Equation 17]}$$

and by multiplying λ by a result of the calculation. In this case, as described above, λ denotes the least common multiple (L.C.M.), so that elements of G' become integer number.

Also, the signature generation node can generate the RSA signature using a first column of G' and 't' number of the partial signature in accordance with Equation (18) below:

$$S'(m) = \left(\prod_{j=1}^{t}(S_{ij}(m))^{g_{j1}}\right) \bmod N, \quad \text{[Equation 18]}$$

wherein 'j' ranges between $1 \leq j \leq t$.

The calculated RSA signature of Equation (19) below has a different value from the RSA signature, generated by using the secret key. This is because λ is multiplied by G', and the Euclidean algorithm can be used to correct this.

$$\prod_{j=1}^{t}(S_{ij}(m))^{g'_{j1}} = \prod_{j=1}^{t}(m^{c_{ij}})^{g'_{j1}} m^{\sum_{j=1}^{t} c_{ij}g'_{j1}} = m^{\lambda d} \bmod N \quad \text{[Equation 19]}$$

The Euclidean algorithm is an algorithm which calculates 'x' and 'y' conforming to, $$\lambda x + ey \equiv 1 \bmod \phi(N),$$

and calculates the message using 'x' and 'y' in accordance with Equation (20) below.

$$(S(m))^e = ((S(m))^x \cdot m^y)^e \bmod N = m^{\lambda dex} m^{ye} \bmod N = m^{\lambda x + ey} = m \quad \text{[Equation 20]}$$

In operation S304, the plurality of nodes update the shares included in the key information at a predetermined time. In this case, a new share can be updated using a new information vector of a new t-tuple vector. For this, the plurality of nodes generate the information vector, $$a^u = (a_1^u, \ldots, a_t^u),$$

and encrypt the generated information vector as a public key 'e'. The public key 'e' is represented as $(a^u)_e$. Also, the plurality of nodes generates a witness in accordance with Equation (21) below:

$$w_i = g^{a_i^u} \bmod N, \quad \text{[Equation 21]}$$

and generates a codeword in accordance with Equation (22) below:

$$c^u = a^u G = (c_0^u, \ldots, c_n^u), \quad \text{[Equation 22]}$$

wherein the $c_0$ denotes the secret key, and flood the encrypted information vector.

The plurality of nodes, having received the information vector which is encrypted via the flooding, generate a new share $c_j$ using the information vector and Equations (23) and (24) below, and consequently can update the shares.

$$(\theta_k)_e = (a_k^u g_{jk})_e \quad \text{[Equation 23]}$$

$$c_j = \sum_{k=1}^{t} \theta_k \quad \text{[Equation 24]}$$

As described above, since a protocol procedure is newly processed using the t-tuple vector, generated by predetermined node among the plurality of nodes, the shares conform to the following Condition A:

Condition A

The threshold scheme is known as 't-secure' when the threshold scheme conforms to the following sub-conditions 1 and 2.
1. When at least 't' number of shares among 'n' number of shares are collected, a secret key may be easily calculated; and
2. When up to 't-1' number of shares among 'n' number of shares are collected, any information about the secret key may not be obtained.

Specifically, when a function of a signature generation is provided in an ad-hoc network, the RSA signature is generated only when the at least 't' number of nodes are collected, 't' denoting a predetermined threshold value. Also, the ad-hoc network is required to conform to the above t-secure feature.

Subsequently, when the updating of the shares at the predetermined time is performed, the threshold scheme can conform to the following Condition B:

Condition B

In case of the following sub-conditions, the threshold scheme is called 't-proactive'.

There can be an assumption for example, that a lifetime of a protocol can be divided at a predetermined time period, and a maximum t-1 node can be corrupted at each time period. When the t-secure and the t-robust condition are conformed to, even when the maximum t-1 node is corrupted, the threshold scheme is t-proactive.

These are conditions to enhance security of the distributed signature. It can be seen that the threshold scheme of the distributed RSA signature method in one general aspect is t-proactive. In this case, the t-robust condition is as follows:

Condition C

The threshold scheme is known as t-robust when the threshold scheme conforms to the following two sub-conditions.

There can be an assumption for example, that the maximum t-1 node can be corrupted during the maximum t-1 node's lifetime. A correct signature can be generated until the maximum t-1 node is corrupted.

The t-robust condition is a necessary condition for the distributed RSA signature.

In operation S305, among the plurality of nodes, the 't' number of nodes, having received a request for shares of an additional node, transmit the shares, generated by using the MDS code, to the additional node. Specifically, when the additional node request a share $C_l$ to the additional node, the 't' number of nodes, having received the request, generates the shares for the additional node.

In this case, the 't' number of nodes select $r_i$ which conform to Equation (25) below, and generates G' with respect to a column location corresponding to an ID(i) of the 't' number of nodes. The, $$1 \leq i \leq t,$$

nodes calculate the shares, $$(SS_i = g'_{jl} \cdot c_l + r_i),$$

generated by using the MDS code, and transmit the calculated shares to the additional node.

$$\sum_{i=1}^{t} r_i = 0 \quad \text{[Equation 25]}$$

In operation S306, the additional node generates shares using the MDS code, generated by using the shares.

The additional node, having received the shares which are generated by using the MDS code on the 't' number of nodes, generates the shares using the shares generated by using the MDS code on the 't' number of nodes in accordance with the following Equation (26) below.

$$c_l = \frac{\sum_{i=1}^{t} ss_i}{\lambda} = \frac{\sum_{i=1}^{t}(c_i g'_{jl} + r_i)}{\lambda} = \frac{c_l \lambda}{\lambda}$$ [Equation 26]

Namely, the dealer node does not participate in the protocol after the distributing of the key information, and performs a procedure for the RSA signature via the calculation between the plurality of nodes and the generation of the shares.

As described above, a function of signature generation can be shared without interaction by including an RSA secret key in an MDS code when a node on the ad-hoc network generates shares using the MDS code. This is possible by using a feature of the MDS capable of generating the RSA secret key and an entire MDS code using a predetermined plurality of the shares. In this case, an inverse matrix of a generator matrix is used during converting of the generator matrix in order to generate the entire MDS code. Also, in order to share the function of the signature generation, the nodes can generate a new share, and generate a witness to determine whether the generated new share is valid.

Figure 4:
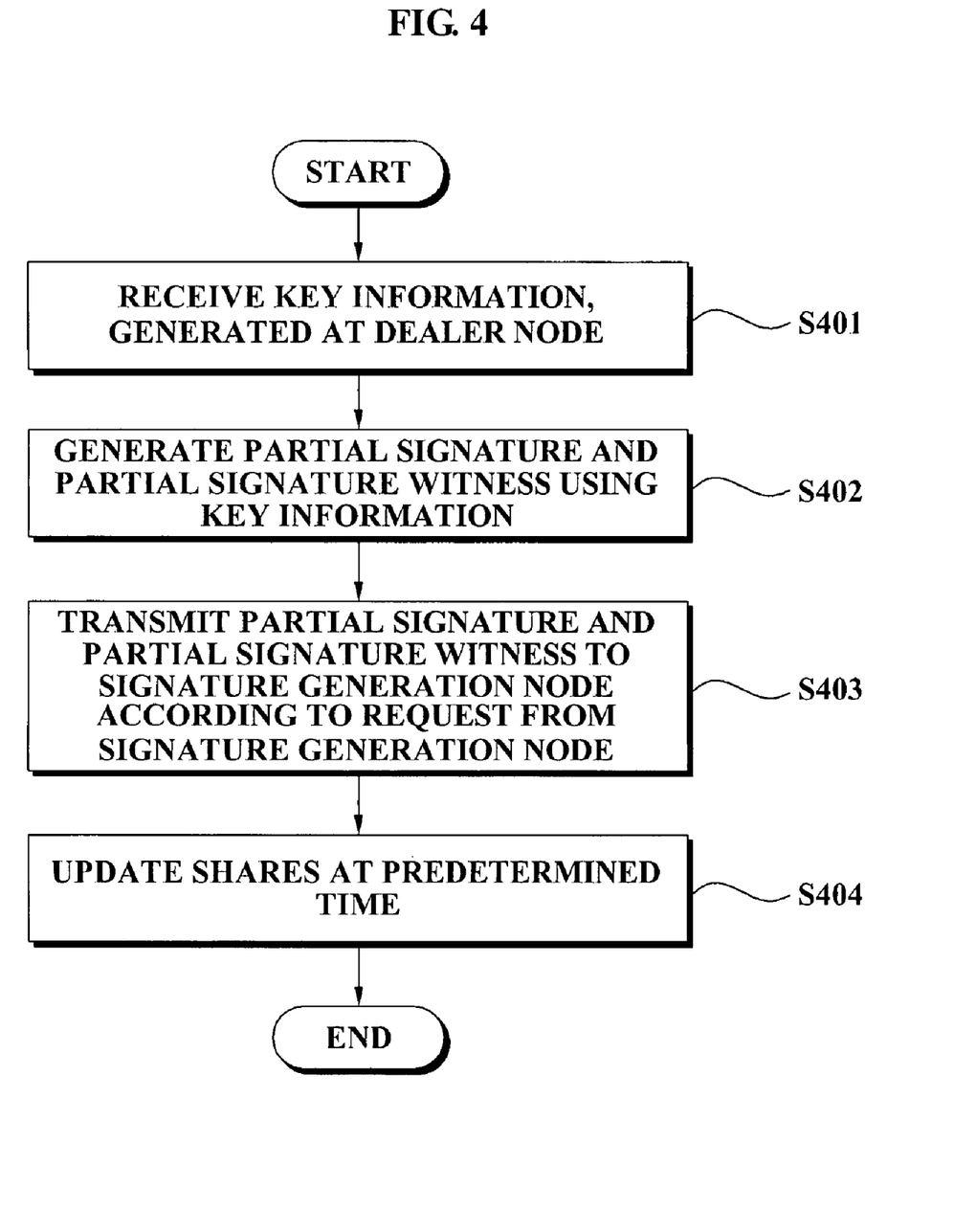
FIG. 4 is a flowchart illustrating an example of a distributed RSA signature method in a node of an ad-hoc network.

FIG. 4 is a flowchart illustrating an example of a distributed RSA signature method in a node of an ad-hoc network In operation S401, a dealer node generates key information using an RSA parameter and an MDS code and transmits key information to nodes on an ad-hoc network. Specifically, in operation S401, a share index 'i' and a share $c_i$ are received from 'n' number of plurality of nodes which participate in a protocol. For this, the dealer node can generate the key information using the RSA parameter and the MDS code.

The RSA parameter can be generated using large prime numbers 'p' and 'q'. In this case, the RSA parameter, public keys 'e' and N, and a secret key 'd' can be generated by using the prime numbers 'p' and 'q'.

Specifically, the dealer node generates the different prime numbers 'p' and 'q', and a predetermined positive number e ($1<e<\emptyset$) is selected to conform to 'ed≡1 mod $\emptyset$' when calculating N=pq, and $\emptyset$. Also, the dealer node calculates a positive number d ($1<d<\emptyset$) conforming to ed≡1 mod $\emptyset$ using the extended Euclidean algorithm, and generates the public keys 'e' and N and the secret key 'd'.

The MDS code can include the above described [n+1, t, n−t+2]q MDS code to embody a (t, n)-threshold scheme. The (t, n)-threshold scheme is to generate an RSA signature using 't' number of nodes among 'n' number of nodes on the ad-hoc network, and the secret key is required to generate the RSA signature. This is required for operation of exponentiation of a secret key 'd' by a message 'm', and the secret key 'd' is distributed to the 'n' number of nodes. The secret key 'd' is then found using the 't' number of nodes, among the 'n' number of nodes.

The MDS code is generated using a t×(n+1) sized generator matrix G, and a number of elements of the MDS code becomes n+1. The first element is taken as the secret key 'd' among the n+1 elements of the MDS code, and all of the n+1 number of elements are found using the 't' number of elements among the remaining 'n' number of elements. Consequently, the secret key 'd' is found using the 't' number of elements.

In this case, the generator matrix can be generated using a feature of the Wandermond matrix in accordance with Equation (2) described above.

The Wandermond matrix is a t×n sized matrix whose 't' number of columns are always linearly independent, and the Wandermond matrix can be used as the generator matrix G.

The MDS code can be generated using the generator matrix in accordance with Equation (8) described above. Namely, the key information can be distributed by transmitting a pair of the 'i' and the $c_i$ ($1 \leq i \leq n$), except the secret key $c_0$, to the 'i' node. Also, the dealer node can generate a witness to determine whether shares, included the 't' number of nodes, are valid, that is, whether the shares are generated using a correct information vector and a correct generator matrix, and the witness is represented as Equation (9) described above.

Namely, the key information can include the witness, and can be open for a plurality of nodes or a signature generation node.

In operation S402, the plurality of nodes generate a partial signature witness using the key information. As described above, since the secret key can be found by using the shares included in the 't' number of nodes among the plurality of nodes, the generation of the RSA signature using the secret key and the generation of the RSA signature using the partial signatures generated using each share included in the 't' number of nodes, have the same results.

However, when the shares are directly delivered to a node which has the message 'm', and require a signature with respect to the message 'm', subsequently, the node generates the RSA signature. This is undesirable because of the exposure of the secret key 'd'. Therefore, nodes, which have the shares, generate the partial signature, deliver the partial signature to the signature generation node which requires the RSA signature, and consequently, the signature generation node can generate a complete RSA signature using the 't' number of the partial signature.

In this case, the nodes can use Equation (1) described above to generate the partial signature.

In operation S403, the nodes transmit the partial signature and the partial signature witness to the signature generation node according to a request from the signature generation node. Specifically, in operation S403, the nodes transmit the $S_i$, 'z', and H of Equation (1), to the signature generation node.

In this case, the signature generation node can generate the RSA signature using the partial signature, calculated from the 't' number of nodes among all nodes on the ad-hoc network. Also, the signature generation node can determine, using the partial signature witness, whether the partial signature is valid.

Specifically, the nodes calculate values of the H and the 'z', and transmit the partial signature witness, that is, a pair of the H and the 'z', to the signature generation node. For this, the nodes select a random number 'r' in accordance with Equation (10) described above, and calculate the H and the 'z' using the random number 'r' in accordance with Equations (11) and (12) described above.

In operation S404, the nodes update the shares included in the key information at a predetermined time. In this case, the updating of the shares can be performed on a predetermined node in the ad-hoc network using an information vector $a^u$ calculated in accordance with Equation (27) below:

$$a^u = (a_1^u, \ldots, a_t^u),$$ [Equation 27]

wherein 't' denotes a required number of nodes to generate the RSA signature and a witness $w_i$ of Equation (21) described above.

In this case, the predetermined node encrypts the information vector into a public key, and generates the witness $w_i$ of Equation (21). Also, the predetermined node generates the codeword of Equation (22) described above, and floods the encrypted information vector.

The nodes, having received the information vector which is encrypted via the flooding, generate a new share $c_j$ using the information vector and Equations (23) and (24) described above, and consequently can update the shares.

As described above, a function of a signature generation can be shared without interaction by including an RSA secret key in an MDS code when a node on the ad-hoc network generates shares using the MDS code. This is possible by using a feature of the MDS capable of generating the RSA secret key and an entire MDS code using a predetermined plurality of the shares.

Also, in order to share the function of the signature generation, the nodes can generate a new share, and generate a witness to determine whether the generated new share is valid.

Figure 5:
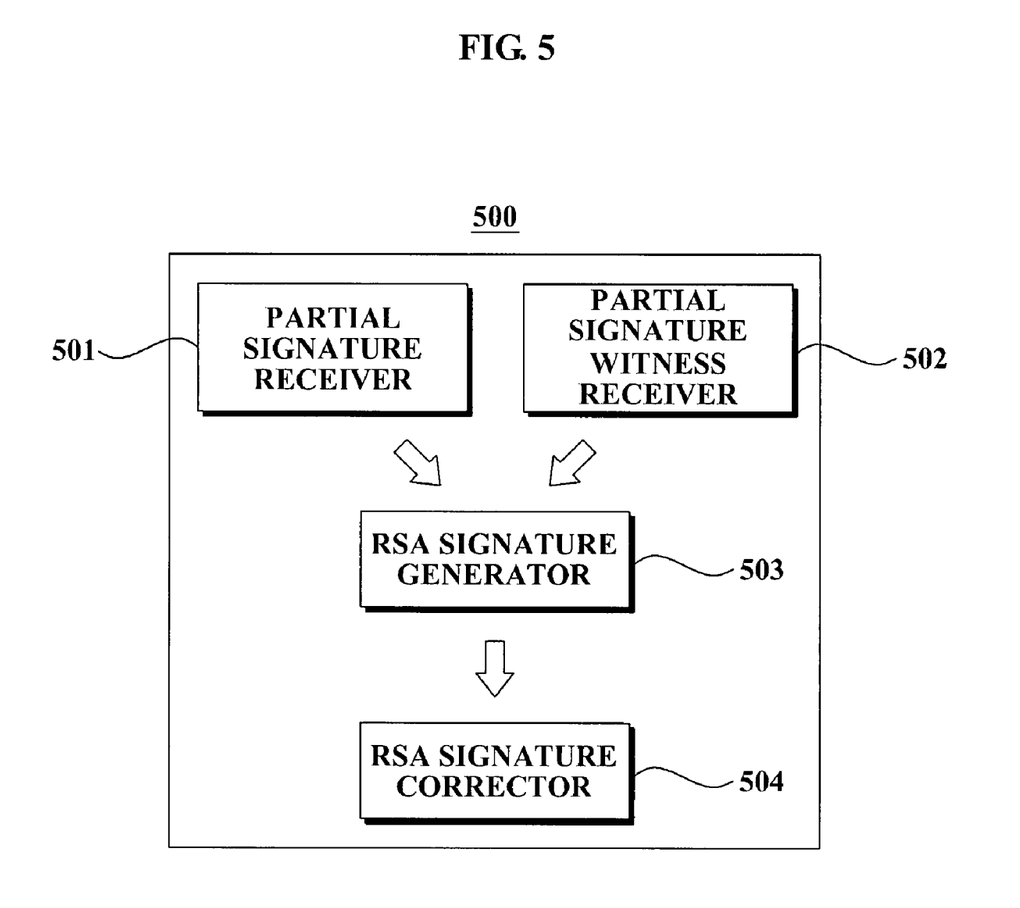
FIG. 5 is a block diagram illustrating an example of an inner configuration of a signature generation node in an ad-hoc network.

FIG. 5 is a block diagram illustrating an example of an inner configuration of a signature generation node of an ad-hoc network. As illustrated in FIG. 5, a signature generation node 500 comprises a partial signature receiver 501, a partial signature witness receiver 502, an RSA signature generation unit 503, and an RSA signature corrector 504.

The partial signature receiver 501 receives a partial signature from a predetermined number of nodes on the ad-hoc network. Specifically, the partial signature receiver 501 receives the $S_i$, 'z', and H of Equation (1) from the predetermined number of nodes. In this case, the partial signature receiver 501 can generate an RSA signature using the partial signature, calculated from 't' number of nodes among all nodes in the ad-hoc network.

The partial signature witness receiver 502 receives the partial signature witness, generated from the 't' number of nodes. Namely, the signature generation node 500 can determine, using the partial signature witness, whether the partial signature is valid. Specifically, the signature generation node 500 calculates the partial signature witness, having been generated from the 't' number of nodes, as represented in Equation (13) described above, compares, $$H(g, m, w_i', S_i(m), g^z(w_i')^{-c}, m^z S_i(m)^{-c}),$$

with 'c', and determines the partial signature is valid when, as a result of the comparison, the two compared values substantially match.

This can be verified via Equations (14) and (15) described above.

The RSA signature generator 503 generates the RSA signature using a generator matrix, the generator matrix being generated by using a feature of the Wandermond matrix and the partial signature. In this case, the RSA signature can be generated after receiving the partial signature from the 't' number of nodes, and the generator matrix can be converted using a partial generator of the generator matrix and an inverse matrix of the partial matrix.

The RSA signature corrector 504 corrects the RSA signature using a Euclidean algorithm. In this case, the Euclidean algorithm can include an algorithm which calculates 'x' and 'y' in accordance with Equation (28) below:

$$\lambda x + ey \equiv 1 \bmod \phi(N), \quad \text{[Equation 28]}$$

wherein $\lambda$ denotes the least common multiple (L.C.M.), so that elements of the converted generator matrix become integer number, 'e' denotes a public key, and $\emptyset(N)$ represents a Euler function $\emptyset(N) = (p-1)(q-1)$. Also, N denotes multiplication of two primes, 'p' by 'q' to generate the public key.

As described above, a function of a signature generation can be shared without interaction by including an RSA secret key in an MDS code when a node on the ad-hoc network generates shares using the MDS code. This is possible by using a feature of the MDS capable of generating the RSA secret key and an entire MDS code using a predetermined plurality of the shares. Also, in order to share the function of the signature generation, the nodes can generate a new share, and generate a witness to determine whether the generated new share is valid.

The RSA signature generation method in an ad-hoc network can be recorded in computer-readable media including program instructions to implement various operations embodied by a computer.

The media can also include, alone or in combination with the program instructions, data files, data structures, and the like. Examples of computer-readable media can include but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media can also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that can be executed by the computer using an interpreter. The described hardware devices can also be configured to act as one or more software modules in order to perform the operations of the above-described examples.

According to examples described above, a function of a signature generation can be shared without interaction by including an RSA secret key in an MDS code when a node in the ad-hoc network generates shares using the MDS code. This generation is possible by using a unique feature of the MDS code capable of generating the RSA secret key and an entire MDS code using a predetermined plurality of the shares.

Also, according to examples described above, a new share can be generated in a node of the ad-hoc network to share a function of a signature generation, and generate a witness to determine whether the new share is valid.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents Accordingly, other implementations are within the scope of the following claims.

What is claimed is:

1. A distributed Rivest Shamir Adleman (RSA) signature generation method in an ad-hoc network, the method comprising:
   distributing key information from a dealer node to a plurality of nodes using an RSA parameter and a maximum distance separable (MDS) code;
   generating a partial signature by the plurality of nodes using the distributed key information;
   transmitting the generated partial signature to a signature generation node in the plurality of nodes; and generating an RSA signature using the generated partial signature, in the signature generation node, the generated partial signature being received from a fewer number of nodes than the plurality of nodes.

2. The method of claim 1, wherein the distributing of the key information comprises:
generating a public key and a private key via the RSA parameter, the RSA parameter being generated by using prime numbers 'p' and 'q';
generating the MDS code using the private key, a generator matrix using a feature of a Wandermond matrix, and an information vector; and
distributing the key information included in the MDS code to the plurality of nodes.

3. The method of claim 2, wherein:
the Wandermond matrix includes and t×n sized matrix, a 't' number of columns being linearly independent; and
the generating of the MDS code comprises:
generating the generator matrix G in accordance with equation, $$G=[(g^j)^{i-1} \bmod \rho],$$

where G is a t×(n+1) sized generator matrix, 'n' denotes a number of the plurality of nodes, 't' denotes a number of required nodes for the generating of the RSA signature, 'i' and 'j' respectively denote $i^{th}$ row and $j^{th}$ column of the G, $\rho$ denotes a prime number greater than max $(g^j)$, and g denotes an element of $Z^*_N$ of a prime number; and
generating the MDS code 'c' using an inner product among the generator matrix G and the information vector 'a' in accordance with equation, $$c=aG=(c_0, \ldots, c_n),$$

wherein 'a' is defined as $\alpha=\{\alpha_1, \ldots, \alpha_t\}(\alpha_i \in (0, \phi(N)))$, $c_0$ is a value of the private key, $c_i$ is a value less than or equal to $tp\phi(N)$, $\emptyset(N)$ is a value $\emptyset(N)=(p-1)(q-1)$ of an Euler function, and N denotes multiplication of 'p' by 'q'.

4. The method of claim 2, further comprising:
generating a witness to open a generated witness,
wherein the generating of the witness comprises generating a witness $w_i$ to transmit the generated witness to the plurality of nodes in accordance with equation, $$w_i = g^{\alpha_i} \bmod N,$$

wherein g denotes an element of $Z^*_N$ of a prime number, and N denotes multiplication of 'p' by 'q'.

5. The method of claim 2, wherein:
the key information includes 'n' number of an element $c_i$ included in the MDS code and an element of information vector 'i'; and
the distributing of the key information further comprises distributing the element $c_i$ and the element of information vector 'i' to the 'n' number of the plurality of nodes.

6. The method of claim 2, wherein:
the key information includes 'n' number of an element $c_i$ included in the MDS code and an element of information vector 'i'; and
the generating of the partial signature and the transmitting of the generated partial signature comprises:
generating the partial signature $S_i$ in accordance with equation, $$S_i(m) = m^{c_i} \bmod N,$$

where 'm' denotes a required message to sign using the RSA signature, and N denotes a modulus which is a multiplication of the prime numbers 'p' by 'q' to generate the RSA parameter;
generating a partial signature witness using the partial signature; and
transmitting the partial signature and the partial signature witness to the signature generation node.

7. The method of claim 6, wherein:
the generating of the partial signature witness using the partial signature comprises:
selecting a random number 'r' in accordance with equation, $$r \in (0, \ldots, 2^{\log_2 N + 2L_H} - 1),$$

wherein $L_H$ denotes a hash length;
generating H using the random number in accordance with equation, $$H(g, m, w'_i, S_i(m), g', m'),$$

where $g'=g^r \bmod N$, $m'=m^r \bmod N$, and $w'=g^{c_i} \bmod N$; and
generating 'z' in accordance with equation, $$Z = c_i c + r; \text{ and}$$

the transmitting of the partial signature and the partial signature witness comprises transmitting the partial signature, 'z', and H to the signature generation node.

8. The method of claim 1, wherein:
the signature generation node generates the RSA signature after receiving the generated partial signature from 't' number of nodes required for the RSA signature generation; and
the generating of the RSA signature comprises:
converting a generator matrix G into matrix G' which includes a diagonal form of a partial matrix, corresponding to column parts $i_1, \ldots, i_t$ of the generator matrix G in accordance with equation, $$G=[(g^j)^{i-1} \bmod \rho]$$

where G is a t×(n+1) sized generator matrix, 'n' denotes a number of the plurality of nodes, 't' denotes the number of required nodes for the RSA signature generation, 'i' and 'j' respectively denote $i^{th}$ row and $j^{th}$ column of G, $\rho$ denotes a prime number greater than max $(g^j)$, and g denotes an element of $Z^*_N$ of a prime number; and
generating G" in accordance with equation, $$G' = \begin{pmatrix} g'_{11} & \cdots & \lambda & \cdots & 0 & \cdots & 0 & \cdots \\ \vdots & & 0 & \cdots & \lambda & \cdots & \vdots & \cdots \\ & & \vdots & & \vdots & \cdots & 0 & \cdots \\ g'_{t1} & & 0 & & 0 & \cdots & \lambda & \cdots \end{pmatrix},$$

where $\lambda$ denotes:
a least common multiple (L.C.M.), so that elements of G' do not become a prime number; and
G' generating the RSA signature using remaining columns except a column converted into the diagonal form of the partial matrix.

9. The method of claim 8, wherein $i_1, \ldots, i_t$ comprises a shared index with respect to 't' number of the partial signature, and
the converting of the partial matrix of the generator matrix G into the diagonal formed matrix and the generating of G' comprises:
calculating an inverse matrix $(G_{sub}^{-1})$ of the partial matrix;

multiplying the generator matrix G, including the partial matrix ($G_{sub}$) in accordance with equation, $G=[P\vdots G_{sub}]$, and the remaining columns P by the inverse matrix ($G_{sub}^{-1}$) in accordance with equation, $G'=[G_{sub}^{-1}P\vdots G_{sub}G_{sub}^{-1}]=[G_{sub}^{-1}P\vdots I]$;

and generating G' by multiplying the generator matrix G multiplied by the inverse matrix $G_{sub}^{-1}$), by the λ.

10. The method of claim 8, wherein:
the remaining columns correspond to a first column $g_{j1}$ of the G'; and
the generating of the RSA signature using the remaining columns except the column converted into the diagonal form of the partial matrix comprises:
generating the RSA signature S'(m) using the partial signature $S_{ij}$ and the first column in accordance with equation, $$S'(m) = \left(\prod_{j=1}^{t}(S_{ij}(m))^{g_{j1}}\right)\mathrm{mod}N,$$

where 'j' is a value ranging between 1≦j≦t, and 'm' denotes a required message to sign using the RSA signature; and
correcting the RSA signature using a Euclidean algorithm.

11. The method of claim 10, wherein:
the Euclidean algorithm is an algorithm which calculates 'x' and 'y' conforming to equation, λx+ey≡1 modφ(N), and the correcting of the RSA signature comprises correcting the RSA signature to obtain the required message using 'x' and 'y' in accordance with equation, $(S(m))^e=((S(m))^x \cdot m^y)^e \mod N = m^{\lambda dex}m^{ye} \mod N = m^{\lambda x+ey}=m$.

12. The method of claim 1, further comprising:
updating shares included in the key information at every predetermined time using the plurality of nodes.

13. The method of claim 1, further comprising:
transmitting shares, generated by using the MDS code, on 't' number of nodes among the plurality of nodes, to an additional node which requests for the shares to join a protocol, the MDS code being represented as equation, $SS_i=g'_{jl} \cdot c_i+r_i$, where $c_i$ denotes the shares included in an $i^{th}$ node of the plurality of nodes, $r_i$ denotes a random number generated in the $i^{th}$ node, and g denotes an element of $Z^*_N$ of a prime number; and
generating the shares using the MDS code, the shares being generated by the addition node in accordance with equation, $$c_l = \frac{\sum_{i=1}^{t}ss_i}{\lambda} = \frac{\sum_{i=1}^{t}(c_i g'_{jl}+r_i)}{\lambda} = \frac{c_l \lambda}{\lambda},$$

wherein λ denotes a least common multipale (L.C.M.), so that elements of a converted generator matrix, generated by converting a partial matrix of a generator matrix G into a diagonal formed matrix, do not become a prime number.

14. A distributed Rivest Shamir Adleman (RSA) signature generation method in a node of an ad-hoc network, the method comprising:
receiving key information from a dealer node, the key information being generated by using an RSA parameter and a maximum distance separable (MDS) code;
generating a partial signature and a partial signature witness using the received key information; and
transmitting the generated partial signature and the generated partial signature witness to a signature generation node according to a request from the signature generation node; and
generating an RSA signature on the signature generation node by using the generated partial signature, the generated partial signature being calculated from 't' number of nodes among all nodes of the ad-hoc network.

15. The method of claim 14, further comprising:
updating shares included in the key information at every predetermined time, the updating of the shares being performed:
on a predetermined node from among all nodes of the ad-hoc network in accordance with equation, $a^u=(a_1^u, \ldots, a_t^u)$, where 't' denotes a required number of the nodes for a generation of the RSA signature; and
using a vector $a^u$, having been encrypted using a public key, and a witness, the witness being represented in accordance with equation, $w_i=g^{a_i^u} \mod N$, wherein N denotes multiplication of two prime numbers to generate the public key and a private key, and g denotes an element of $Z^*_N$ and a prime number.

16. The method of claim 14, wherein the signature generation node determines whether the generated partial signature is valid using the generated partial signature witness.

17. The method of claim 14, wherein the MDS code is generated using a generator matrix G, generated using a Wandermond matrix, in accordance with equation, $S_i(m)=m^{c_i} \mod N$, where G is a t×(n+1) sized generator matrix, 'n' denotes a number of the plurality of nodes, 't' denotes the required number of the nodes to generate the RSA signature, 'i' and 'j' respectively denote $i^{th}$ row and $j^{th}$ column of the G, ρ denotes a prime number greater than max ($g^j$), and g denotes an element of $Z^*_N$ and a prime number.

18. A computer-readable storage medium having stored thereon instructions for implementing a distributed Rivest Shamir Adleman (RSA) signature generation method in a node of an ad-hoc network, the method comprising:
distributing key information from a dealer node to a plurality of nodes using an RSA parameter and a maximum distance separable (MDS) code;
generating a partial signature by the plurality of nodes using the distributed key information;
transmitting the generated partial signature to a signature generation node in the plurality of nodes; and
generating an RSA signature using the generated partial signature, in the signature generation node, the generated partial signature being received from a fewer number of nodes than the plurality of nodes.

19. A signature generation node of an ad-hoc network, comprising:
- a partial signature receiver configured to receive a partial signature generated by a predetermined number of nodes in the ad-hoc network; and
- a Rivest Shamir Adleman (RSA) signature generator configured to generate an RSA signature using a generator matrix, the generator matrix being generated using the partial signature and a feature of a Wandermond matrix,
- wherein the generator matrix is converted using a partial matrix of the generator matrix and an inverse matrix of the partial matrix, and
- wherein at least one of the partial signature receiver and the RSA signature generator is implemented as hardware or a combination of software and hardware.

20. The signature generation node of claim 19, further comprising:
- a witness receiver configured to receive a partial signature witness generated on the signature generation node,
- wherein $(S_i(m))$ is generated on the node in accordance with equation, $$S_i(m) = m^{c_i} \bmod N,$$

where 'm' denotes a required message to sign using the RSA signature, and N denotes multiplication of the prime numbers 'p' and 'q' to generate the RSA parameter.

21. The signature generation node of claim 19, wherein the RSA signature generator is further configured to generate:
the RSA signature using a first column of the converted generator matrix G' in accordance with equation, $$G' = \begin{pmatrix} & i_1 & \cdots & & i_t & \\ g'_{11} & \cdots & \lambda & \cdots & 0 & \cdots & 0 & \cdots \\ \vdots & & 0 & \cdots & \lambda & \cdots & \vdots & \cdots \\ & & & & \vdots & \cdots & 0 & \cdots \\ g'_{t1} & & 0 & & 0 & \cdots & \lambda & \cdots \end{pmatrix},$$

where $\lambda$ denotes a least common multiple (L.C.M.), so that elements of the G' do not become a prime number; and
and the partial signature, in accordance with equation, $$S'(m) = \left( \prod_{j=1}^{t} (S_{ij}(m))^{g_{j1}} \right) \bmod N,$$

where 'j' is a value equal to or greater than one and equal to or less than 't', 't' denotes a number of required nodes to generate the RSA signature, $c_i$ denotes shares included in an 'i' node, 'm' denotes a required message to sign using the RSA signature, N denotes multiplication of two prime numbers to generate a public key and a private key, and g denotes an element of $Z^*_N$ and a prime number.

22. The signature generation node of claim 19, further comprising:
- an RSA signature corrector configured to correct the RSA signature using a Euclidean algorithm,
- wherein the Euclidean algorithm calculates 'x' and 'y' in accordance with equation, $$\lambda x + ey \equiv 1 \bmod \phi(N),$$

wherein $\lambda$ denotes a least common multiple (L.C.M.), so that the elements of the converted generator matrix, generated by converting the partial matrix of the generator matrix into a diagonal formed matrix, do not become a prime number, 'e' denotes a public key, Ø(N) is a value Ø(N)=(p−1)(q−1) of an Euler function, and N denotes multiplication of 'p' by 'q'.

\* \* \* \* \*